United States Patent
Yamaguchi et al.

Patent Number: 5,436,878
Date of Patent: Jul. 25, 1995

[54] DISC RECORDING AND/OR REPRODUCING APPARATUS FOR PERMITTING CONTINUOUS SECTOR PROCESSING AT BOUNDARIES BETWEEN RECORDING REGIONS WITH DIFFERENT RECORDING DENSITIES

[75] Inventors: Takao Yamaguchi, Kanagawa; Takayoshi Chiba, Tokyo, both of Japan

[73] Assignee: Sony Corporation, Tokyo, Japan

[21] Appl. No.: 68,118

[22] Filed: May 25, 1993

[30] Foreign Application Priority Data

May 27, 1992 [JP] Japan ................... 4-134997

[51] Int. Cl.$^6$ ................................ G11B 7/00
[52] U.S. Cl. ........................ 369/47; 369/48; 369/50; 369/58
[58] Field of Search ................ 369/47, 48, 49, 50, 369/54, 58, 59, 124, 32, 44.26, 275.3

[56] References Cited

U.S. PATENT DOCUMENTS

| | | |
|---|---|---|
| 4,825,321 | 4/1989 | Hassel et al. |
| 5,138,599 | 8/1992 | Fukushima et al. ........ 369/58 |

FOREIGN PATENT DOCUMENTS

| | | | |
|---|---|---|---|
| 0461912A2 | 12/1991 | European Pat. Off. ...... G11B 20/10 |
| 2578346 | 9/1986 | France ........................ G11B 25/04 |
| 2635401 | 2/1990 | France ........................ G11B 5/02 |
| WO87/03129 | 5/1987 | WIPO ......................... G11B 5/016 |

*Primary Examiner*—Georgia Y. Epps
*Assistant Examiner*—Muhammad N. Edun
*Attorney, Agent, or Firm*—Limbach & Limbach; Philip M. Shaw, Jr.

[57] ABSTRACT

A disc recording and/or reproducing apparatus for recording and/or reproducing information signals on or from an optical disc on which there is formed a spirally extending recording track is disclosed. The apparatus includes fundamental clock generating circuits for generating fundamental clocks $CK_A$ and $CK_B$ having different frequencies associated with recording regions $E_A$ and $E_B$ of different recording densities formed on the optical disc, and a clock changeover circuit for making a changeover between the fundamental clocks $CK_A$ and $CK_B$ from the fundamental clock generating circuits based on the boundary position information between the recording regions $E_A$ and $E_B$. During transition from a first recording region of a first recording density to a second recording region of a second recording density, the clocks from the clock generating circuit are changed over instantly to the fundamental clock associated with the second recording region to enable plural recording regions with different recording densities to be processed continuously.

2 Claims, 4 Drawing Sheets

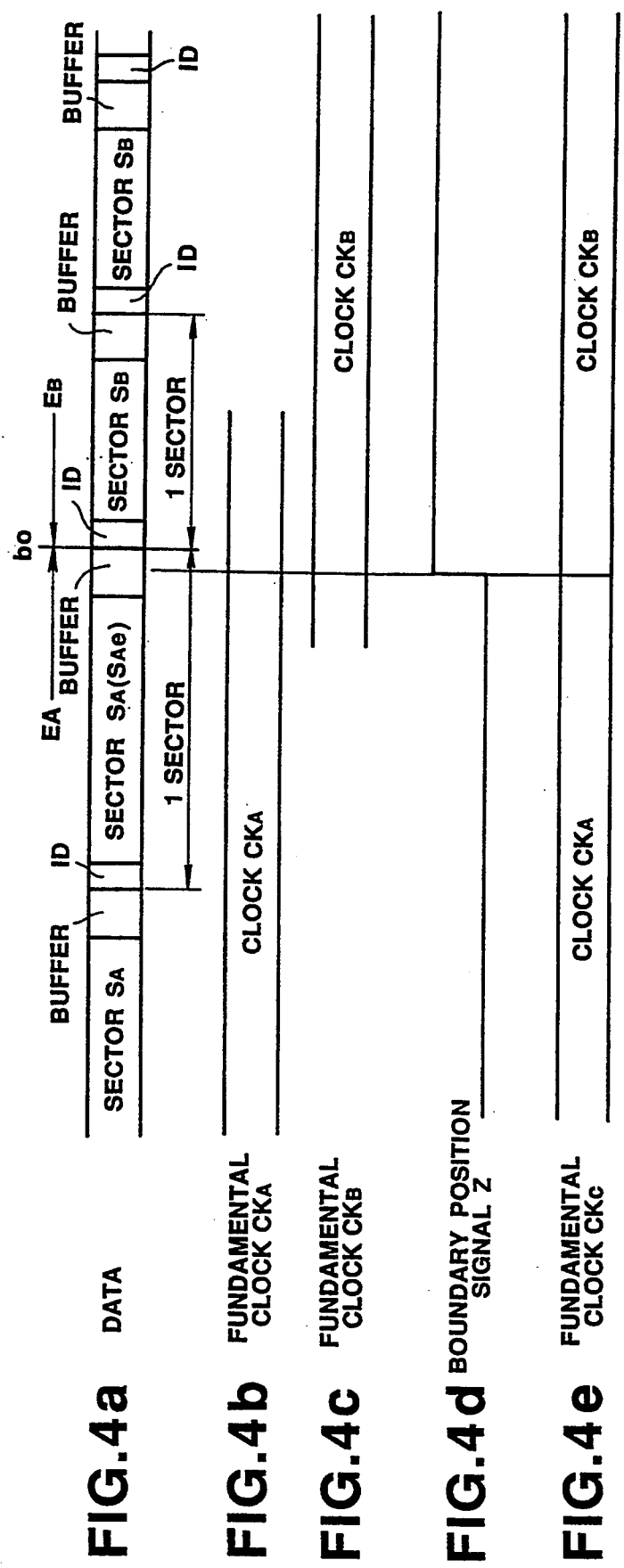

DISC RECORDING AND/OR REPRODUCING APPARATUS FOR PERMITTING CONTINUOUS SECTOR PROCESSING AT BOUNDARIES BETWEEN RECORDING REGIONS WITH DIFFERENT RECORDING DENSITIES

BACKGROUND OF THE INVENTION

1. Field of the Invention

This invention relates to a disc recording and/or reproducing apparatus on which a recording track is formed for extending spirally thereon for recording/reproducing information signals. More particularly, it relates to a disc recording and/or reproducing apparatus for enabling continuous data to be recorded on or reproduced from a disc having plural recording regions having different recording densities.

2. Description of the Related Art

A variety of recording formats for optical discs as disc-shaped recording media for recording information signals have hitherto been proposed for procuring a larger recording capacity and for reliably recording information signals and for realizing highly reliable playback.

As a recording format for an optical disc, there is known a constant linear velocity (CLV) system capable of procuring a large recording capacity. With this CLV system, a disc driving motor is controlled to achieve a rotational velocity of the disc that is inversely proportional to the track radius so that the linear velocity of the recording track will be constant at any position on the disc. If the spirally extending recording track is segmented into continuous sectors each being of a predetermined length, from the inner rim towards the outer rim of the disc, data recording may be made in synchronism with predetermined clocks, while recorded data may be reproduced for data playback within a predetermined frequency range. The CLV system is advantageous in that the output power of a recording laser may be used under substantially the same recording and/or reproducing conditions for any position on the disc.

There is also known a constant angular velocity (CAV) system in which the spindle motor rotation and the recording and/or playback frequency may be kept constant. Although the CAV system is advantageous in that the motor control circuitry is simplified and the spindle motor may be reduced in size, the recording density reaches a maximum at the inner most part of the disc recording region. The number of sector marks is prescribed by the recording density. On the other hand, the radially outer part of the recording region is divided into sectors in accordance with the number of sector marks prescribed for the radially inner part of the recording region. Consequently, the recording density at the radially outer part of the recording region and becomes lower than that at the radially inner part of the recording region, as a result, the overall recording capacity of the recording region of a disc of the CAV system is lowered as compared to that of the disc of the CLV system.

As another recording format for an optical disc, there is proposed a modified CLV (M-CLV) system, which is modified to simplify the speed change control of the spindle motor adapted for rotationally driving the disc and in which advantage is taken of the larger recording capacity of the CLV system disc.

In connection with the CAV system, there is also known a modified CAV (M-CAV) system which is modified as to the defect of the small recording capacity of .the disc and in which advantage is taken of facilitated rotational control of the spindle motor. With the recording and/or reproducing apparatus, constructed in accordance with the M-CAV system, the recording frequency for the information signals is increased towards a radially outer part of the recording disc.

Meanwhile, in the case of a disc of the M-CAV or zone-CAV system having plural recording regions of different recording densities, a buffer track is provided at the boundary region between the recording regions of the different recording densities. This buffer track is provided as a transition region from a recording region of a recording density to another recording region of another recording density. Clocks or various parameters of the disc recording and/or reproducing apparatus are changed over within this transition region.

However, with the conventional disc recording and/or reproducing apparatus, sector processing is interrupted at the boundary region between the recording regions of the different recording densities of the disc during recording and/or reproduction of the information signals on or from the disc having plural recording regions with the different recording densities. Consequently, data recording or playback cannot be carried out continuously, thus leading to a lowered processing speed for recording or playback.

SUMMARY OF THE INVENTION

It is an object of the present invention to provide a disc recording and/or reproducing apparatus whereby the playback processing speed for different recording regions may be increased.

It is another object of the present invention to provide a disc recording and/or reproducing apparatus whereby the necessity of changing over the blocks or the various parameters at the boundary region between the recording regions of the different recording regions may be obviated.

The above and other objects of the present invention will become more apparent from the following description of the preferred embodiments and the claims.

According to the present invention, there is provided a disc recording and/or reproducing apparatus for recording or reproducing information signals on or from a disc on which a spirally extending recording track is formed, including a clock generating circuit for generating plural clocks having different frequencies, the clocks being associated with plural recording regions formed on said disc so as to have different recording densities, and a changeover circuit for changing over the clocks from the clock generating circuit based on a boundary position signal indicating the boundary between said recording regions of the different recording densities.

The boundary position signals include the track numbers or sector numbers within an ID region included within each sector.

It is noted that, during transition from a first recording region of a first recording density to a second recording region of a second recording density, clocks from the clock generating circuit are instantly changed over to those associated with the second recording region of the second recording density based on the information of the boundary position between the recording regions of the different recording densities.

BRIEF DESCRIPTION OF THE DRAWINGS

FIGS. 4A, 4B, 4C, 4D, and 4E are timing charts showing the changeover timings of fundamental clocks associated with boundary regions between different recording regions.

DETAILED DESCRIPTION OF THE PREFERRED EMBODIMENTS

Figure 1:
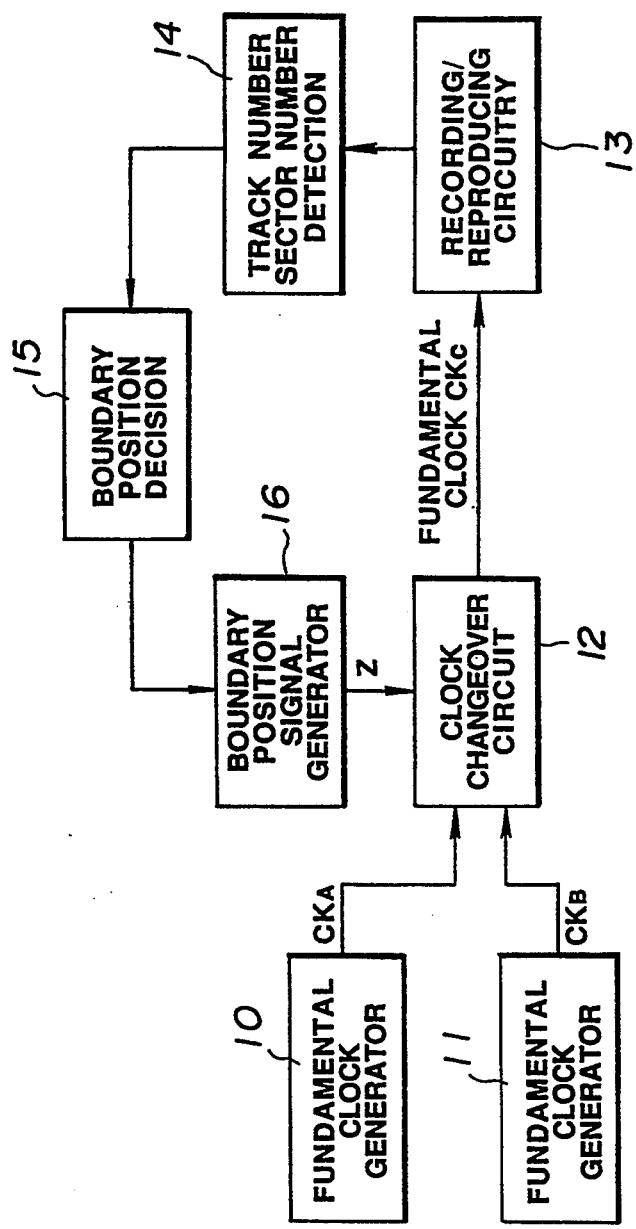
FIG. 1 is a block circuit diagram showing essential parts of a disc recording/reproducing apparatus according to the present invention.

Referring to the drawings, the preferred embodiments of the disc recording and/or reproducing apparatus according to the present invention will be explained in detail.

Figure 2:
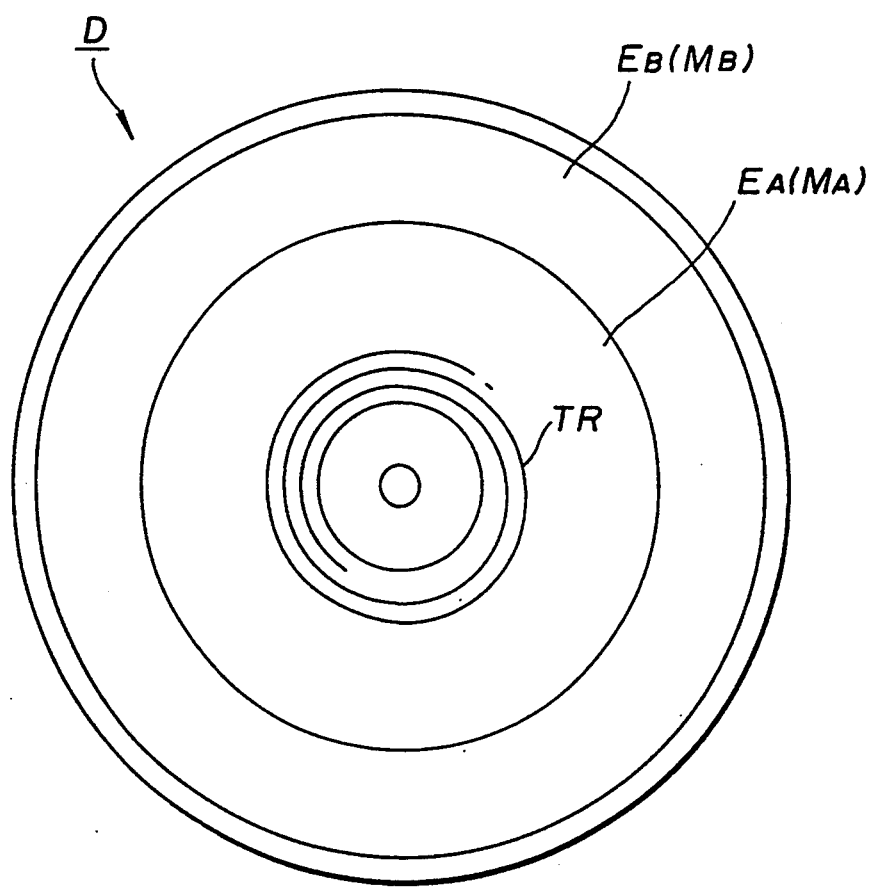
FIG. 2 is a schematic plan view showing an optical disc with recording regions having different recording densities.
Figure 3:
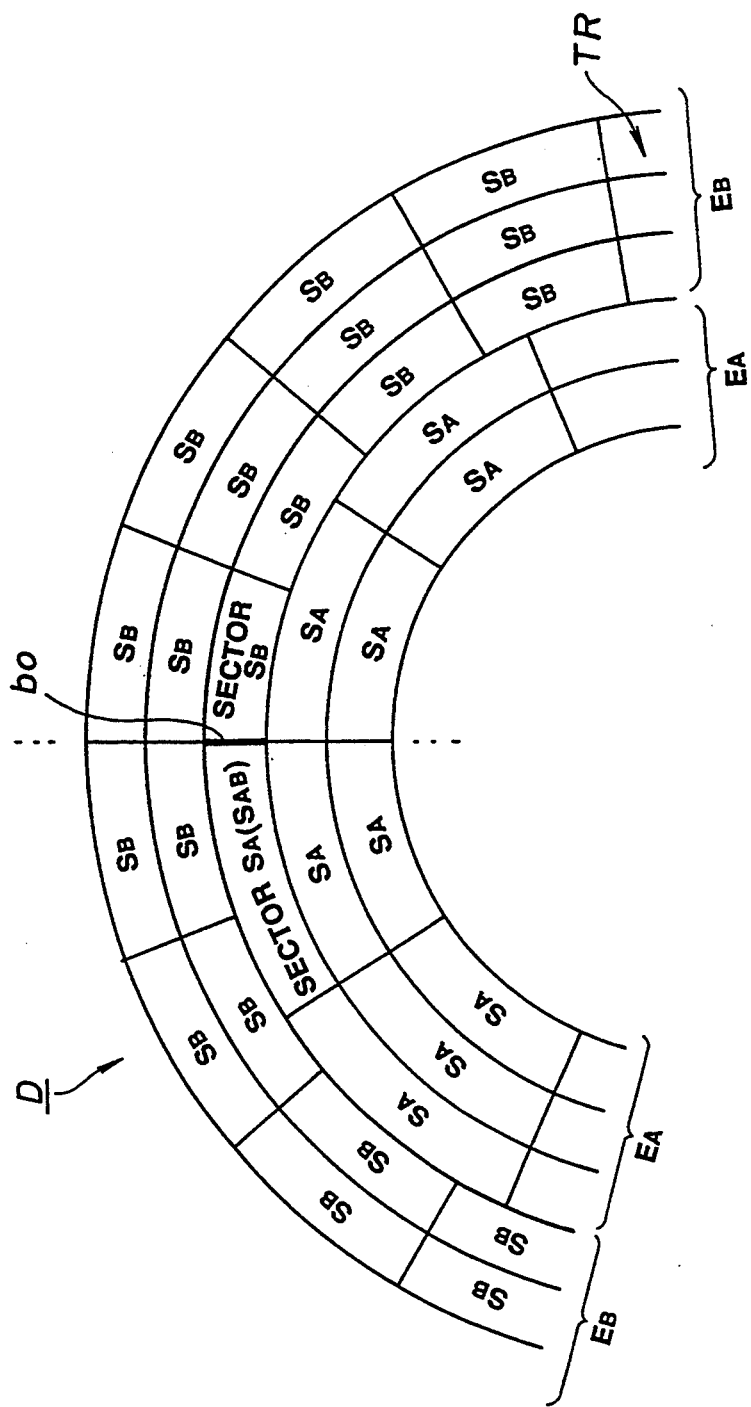
FIG. 3 is an enlarged diagrammatic view showing recording regions on the optical disc shown in FIG. 2.

The disc recording and/or reproducing apparatus according to the present invention is designed for recording and/or reproducing information signals on or from an optical disc D having plural recording regions of different, recording densities thereon, such as a disc having a spirally extending recording track TR formed thereon as shown in FIGS. 2 and 3 and employed in conjunction with a disc recording and/or reproducing apparatus operating in accordance with the M-CAV system or the zone CAV system.

The plural recording regions of different, recording densities include a recording region $E_A$ consisting of plural sectors $S_A$ each having a recording density $M_A$ and another recording region $E_B$ consisting of plural sectors $S_B$ each having a different recording density $M_B$ different from the recording density $M_A$ of the recording region $E_A$.

The disc recording and/or reproducing apparatus according to the present invention includes fundamental clock generating circuits 10, 11, as clock generating means, for generating clocks of different frequencies, or fundamental clocks $CK_A$ and $CK_B$, associated with the recording regions $E_A$, $E_B$ formed on the optical disc D with different recording densities, and a clock changeover circuit 12 as changeover means for making a changeover between the clocks $CK_A$ and $CK_B$ from the fundamental clock generating circuits 10, 11 based on the boundary position information between the recording regions $E_A$ and $E_B$ of the different recording densities.

It is noted that, since the optical disc D has the recording region $E_A$ with the recording density $H_A$ and the recording region $E_B$ with the recording density $M_B$ and the recording track TR spirally extending thereon, the sectors $S_A$ and $S_B$ having the different recording densities are arrayed adjacent to each other at a boundary bo between the recording regions $E_A$ and $E_B$, as shown in FIG. 3. With the disc recording and/or reproducing apparatus of the present invention, the sectors $S_A$ and $S_B$ at the boundary bo may be processed continuously.

The concrete constitution of the disc recording and/or reproducing apparatus according to the present invention shown in FIG. 1 will be explained.

The fundamental clock generating circuit 10 of the disc recording and/or reproducing apparatus shown in FIG. 1 is a block for generating fundamental clocks $CK_A$ which are the clocks having the frequency necessary for processing the sectors $S_A$ in the recording region $E_A$ of the recording density $M_A$, and outputs the clocks $CK_A$ associated with the recording density $M_A$.

On the other hand, the fundamental clock generating circuit 11 is a block for generating fundamental clocks $CK_B$ which are the clocks having the frequency necessary for processing the sectors $S_B$ in the recording region $E_B$ of the recording density $M_B$, and outputs the clocks $CK_B$ associated with the recording density $M_B$.

The fundamental clocks $CK_A$ from the fundamental clock generating circuit 10 and the fundamental clocks $CK_B$ from the fundamental clock generating circuit 11 are transmitted via clock changeover circuit 12 to recording/playback circuitry 13. The clock changeover circuit 12 makes a changeover between and coupling of the fundamental clocks $CK_A$ and $CK_B$ based on a boundary position signal Z as later described. Meanwhile, the fundamental clocks $CK_A$ and $CK_B$ are changed over and coupled at the timing consistent with the boundary position signal Z by the clock changeover circuit 12. However, with the present embodiment, the clocks outputted from the clock changeover circuit 12 are termed fundamental clocks $CK_C$.

The recording/playback circuitry 13 causes data to be recorded on or reproduced from the optical disc D based on the fundamental clocks $CK_C$ from the clock changeover circuit 12. That is, the recording/playback circuitry 13 processes the sectors $S_A$ within the recording region $E_A$ having the recording density $M_A$ if the frequency of the fundamental clocks $CK_C$ is the aforementioned fundamental clock $CK_A$, while processing the sectors $S_B$ within the recording region $E_B$ having the recording density $M_B$ if the frequency of the fundamental clocks $CK_C$ is the aforementioned fundamental clock $CK_B$.

From the recording/playback circuitry 13, the ID information, appended to each sector, of the recording data on the optical disc D or the playback data from the optical disc D, is taken out. The ID information contains e.g. track numbers and sector numbers etc. The information concerning the track numbers and sector numbers etc. is transmitted to a detection circuit 14.

The detection circuit 14 discriminates the track numbers and sector numbers of the recording data on or playback data from the optical disc D, and transmits the discrimination information to a boundary position decision circuit 15.

The boundary position decision circuit 15 discriminates the boundary position between the recording region $E_A$ and the recording region $E_B$ from the current recording data or the playback data. That is, the circuit 15 discriminates at which sector of which track as counted from the track number and sector number of the current recording data or playback data is located the aforementioned boundary position. This decision information is transmitted to a boundary position signal generating circuit 16.

When the boundary position is reached, the boundary position signal generating circuit 16 outputs, based on the abovementioned decision information, the boundary position signal Z, as the above-mentioned boundary position information, indicating the effect of having reached the boundary position. The boundary position signal Z is transmitted to the clock changeover circuit 12, as a controlling signal for controlling the changeover between the fundamental clocks $CK_A$ and $CK_B$ by the clock changeover circuit 12.

Based on the above-mentioned boundary position signal Z, as the changeover control signal, the clock changeover circuit 12 effectuates a changeover between the fundamental clocks $CK_A$ and $CK_B$ supplied from the fundamental clock generating circuits 10 and 11.

In this manner, the fundamental clocks $CK_C$ transmitted from the clock changeover circuit 12 to the recording/playback circuitry 13 are those associated with the recording regions $E_A$ or $E_B$ of the optical disc D.

Referring to FIGS. 4A, 4B, 4C, 4D and 4E, the relation between the recording region and the changeover timing of the fundamental clocks in the disc recording and/or reproducing apparatus according to the present invention is explained in detail.

In the present embodiment, the sectors of the recording data on the optical disc D or the playback data from the disc D are changed over at the boundary bo from the sector $S_A$ to the sector $S_B$, as an example, as shown in FIG. 4A. Meanwhile, a data area of each sector is usually followed by a buffer area. The area for the aforementioned ID information is shown in FIG. 4A along with the buffer area contained in each of the sectors $S_A$ and $S_B$.

Responsive to the decision information from the boundary position decision circuit 15, which is based on the track number and the sector number, the boundary position signal generating circuit 16 outputs the above-mentioned boundary position signal Z, as shown in FIG. 4D. With the boundary position signal generating circuit of the present embodiment, the boundary position signal Z indicating the boundary position is enabled after the end of processing of the last sector $S_A$ or sector $S_{Ae}$ of the recording region $E_A$. In the present embodiment, the boundary position signal Z is enabled by going from "L" to "H" in the vicinity of the above-mentioned buffer region. The boundary position signal Z is transmitted to the clock changeover circuit 12.

The clock changeover circuit 12 outputs the fundamental clock $CK_C$, which is changed over from the fundamental clock $CK_A$ to the clock $CK_B$ and coupled in a timed relation to the enablement of the boundary position signal Z, as shown in FIG. 4E. Thus the recording/playback circuitry 13, supplied with the ultimately completed fundamental clock $CK_C$, is able to perform continuous sector processing even at the boundary bo of transition from the recording region $E_A$ to the recording region $E_B$. That is, processing of the sector $S_A$ of the recording region $E_A$ is performed by the clocks of the frequency of the fundamental clocks $CK_A$. Subsequently, when the recording region is changed over to the recording region $E_B$, processing of the sector $S_B$ of the recording region $E_B$ is performed with the clocks of the frequency of the fundamental clocks $CK_B$.

It is seen from above that, with the disc recording and/or reproducing apparatus according to the present invention, since there are provided the detection circuit 14, the boundary position decision circuit 15 and the boundary position signal generating circuit 16, and the fundamental clocks are changed over instantaneously by the clock changeover circuit 12, the sectors $S_A$ and $S_B$ having different recording densities may be continuously processed without the necessity of providing transition domains, such as buffer tracks, as required in the above-described prior-art system.

Meanwhile, in the present embodiment, description has been made of the boundary between the two recording regions $E_A$ and $E_B$. However, if there are three or more recording regions, instead of two, continuous sector processing may similarly be achieved at each boundary section bo.

In the above embodiment, each sector is processed with clocks of a single frequency. However, with the present disc recording and/or reproducing apparatus, if plural clocks are required for processing each sector, the sector in need of the plural clocks may be processed by changing over the clocks in a similar manner.

What is claimed is:

1. A disc recording and/or reproducing apparatus for recording or reproducing signals on or from a disc on which a spirally extending recording track is formed, comprising clock generating means for generating plural clocks having different frequencies, the clocks being associated with plural recording regions formed on the disc so as to have different recording densities;

changeover means for changing over the clocks from the clock generating means based on enablement of a boundary position signal indicating a boundary between the recording regions of the different recording densities;

head position detection means for finding the current head position from playback signals from the disc;

boundary position decision means for deciding, based on signals from the head position detection means, that a given position is a boundary position between the different recording regions, the boundary position signal being produced by the boundary position decision means; and wherein an ultimately completed fundamental clock performs continuous sector processing even at the boundary between the recording regions.

2. A recording and/or reproducing apparatus for recording information signal on or reproducing recorded signals from a disc on which a spirally extending recording track is formed and divided into plural recording regions radially of the disc, with the signals being recorded at the same recording density in the same recording region and at different recording densities in different recording regions, comprising head position detection means for finding the current head position from signals reproduced from the disc, boundary position decision means for finding, based on results of decision from the head position detection means, that the head has reached a boundary position between the different recording regions, boundary position signal generating means for generating a boundary position signal based on the results of decision from the boundary position decision means, clock generating means for generating plural clock signals with different frequencies associated with the recording densities of the plural recording regions, and clock changeover means for changing over said plural clock signals from the clock generating means responsive to the boundary position signal, such that an ultimately completed fundamental clock performs continuous sector processing even at the boundary position between the different recording regions;

signal recording and/or playback on or from the recording regions being made based on the clock signals associated with the recording regions as selected by the clock changeover means.

* * * * *